United States Patent
Ahmad et al.

(10) Patent No.: US 12,554,782 B2
(45) Date of Patent: Feb. 17, 2026

(54) SELF-IMPROVING SYSTEM FOR SEARCHING CROSS-LINGUAL AND MULTI-MEDIA DATA

(71) Applicant: Vectara Inc., Cupertino, CA (US)

(72) Inventors: Amin Ahmad, Cupertino, CA (US); Amr Awadallah, Palo Alto, CA (US); Tallat Shafaat, Islamabad (PK)

(73) Assignee: Vectara, Inc., Palo Alto, CA (US)

( * ) Notice: Subject to any disclaimer, the term of this patent is extended or adjusted under 35 U.S.C. 154(b) by 179 days.

(21) Appl. No.: 18/100,206

(22) Filed: Jan. 23, 2023

(65) Prior Publication Data
US 2023/0237103 A1  Jul. 27, 2023

Related U.S. Application Data

(60) Provisional application No. 63/302,118, filed on Jan. 23, 2022.

(51) Int. Cl.
*G06F 16/951* (2019.01)
*G06F 16/9532* (2019.01)
*G06F 16/954* (2019.01)

(52) U.S. Cl.
CPC ........ *G06F 16/951* (2019.01); *G06F 16/9532* (2019.01); *G06F 16/954* (2019.01)

(58) Field of Classification Search
CPC .............. G06F 16/951; G06F 16/9532; G06F 16/954
See application file for complete search history.

(56) References Cited

U.S. PATENT DOCUMENTS

| | | | | |
|---|---|---|---|---|
| 6,381,605 B1* | 4/2002 | Kothuri | ............... | G06F 16/2264 707/999.102 |
| 6,470,344 B1* | 10/2002 | Kothuri | ................. | G06F 16/283 707/696 |
| 7,243,102 B1* | 7/2007 | Naam | ................... | G06F 16/334 |
| 10,565,562 B2* | 2/2020 | Saha | ................. | G06F 16/90335 |
| 11,574,551 B1* | 2/2023 | Sabapathy | ............... | G09B 3/02 |
| 11,803,556 B1* | 10/2023 | Samdani | .......... | G06F 16/24578 |
| 2005/0198076 A1* | 9/2005 | Stata | ...................... | G06F 16/316 |
| 2012/0124040 A1* | 5/2012 | Mungikar | ............. | G06F 16/248 707/E17.084 |
| 2015/0248450 A1* | 9/2015 | Akdogan | ................ | G06F 16/29 707/743 |
| 2019/0236102 A1* | 8/2019 | Wade | ...................... | G06F 40/205 |
| 2020/0004835 A1* | 1/2020 | Ramanath | .............. | G06N 3/088 |
| 2020/0089714 A1* | 3/2020 | Melnik | .................... | G06F 16/953 |
| 2020/0192920 A1* | 6/2020 | Filonov | .................... | G06N 20/00 |
| 2020/0380032 A1* | 12/2020 | Wills | ....................... | G06N 20/00 |
| 2021/0202045 A1* | 7/2021 | Neumann | ................ | G06N 3/08 |
| 2022/0130493 A1* | 4/2022 | Turner | ................... | G16H 70/40 |
| 2022/0171873 A1* | 6/2022 | Lundbæk | ............... | G06N 3/082 |
| 2023/0237103 A1* | 7/2023 | Ahmad | ................... | G06F 16/954 707/706 |

* cited by examiner

*Primary Examiner* — Mark E Hershley
(74) *Attorney, Agent, or Firm* — Rimon PC

(57) ABSTRACT

A dynamic approach to indexing of content that allows a trained neural network to determine the graduality of indexes and/or the types of indexes that are employed. This dynamic approach may include generation of multiple indexes on the same content using multiple indexing algorithms.

15 Claims, 2 Drawing Sheets

SELF-IMPROVING SYSTEM FOR SEARCHING CROSS-LINGUAL AND MULTI-MEDIA DATA

CROSS-REFERENCE TO RELATED APPLICATIONS

This application claims priority and benefit of U.S. provisional patent application Ser. No. 63/302,118 filed Jan. 23, 2022, the disclosure of which is hereby incorporated herein in its entirety.

SUMMARY

The explosive growth of the internet over the last three decades has made the ability to perform advanced searches an indispensable tool. Search is needed for both the internet as a whole and for private and/or dedicated sets of information. Search is need across multiple media types including text, images, video and both structured and unstructured data.

While search has advanced over the years, it has yet to fully take advantage of other advances in computer science, such as artificial intelligence and machine learning. Disclosed herein are new search systems and methods including several different artificial intelligence aspects. For example, some embodiments include a dynamic approach to indexing of content that allows a trained neural network to determine the graduality of indexes and/or the types of indexes that are employed. This dynamic approach may include generation of multiple indexes on the same content using multiple indexing algorithms. Some embodiments include a query router configured to select with of multiple indexes to use in the execution of a specific query. Some embodiments include a "re-ranker" configured to rank results obtained from an initial query result. The re-ranker may be directed at a much more limited set of data (e.g., the results of an initial search) relative to the initial search. As such, the algorithm(s) used for re-ranking may use a more computational complex approach. Further, the re-ranker may include a neural network trained to rank specific types of data or types of query results, and the re-ranker may be trained and/or optimized separately from the logic that produces the initial search results. Some embodiments include calibration logic configured to normalize search scores such that they represent an actual probability that the results represent content sought by a user. This calibration logic may be based on multiple scores, including for example both scores generated in an initial query and scores generated by the re-ranker.

Various embodiments of the invention include an information retrieval system comprising: indexing logic configured to index content, the content including at least text data and image data, indexing of the content including generation of indexes (embeddings) of dynamic granularity, the granularity being dependent on one or more of: characteristic access patterns for the content, identification of multiple levels of salient points within the content, and a preliminary parsing of the content to determine a level of segmentation; index storage configured to store indexes of the content, the indexes being generated using a plurality of indexing algorithms each configured to generate a separate set of indexes of the content, the content optionally being indexed by more than one set of indexes, the indexing algorithms including at least one of: the indexing logic, BM25, a key word indexer and dual encoding neural networks; and content serving logic configured to provide subsets of the content in response to a search query, the content serving logic comprising any combination of: query routing logic configured to determine which of the sets of indexes stored in index storage a query should be applied to, query logic configured to execute the query on the determined sets of indexes, reranking logic configured to receive one or more sets of query results from the query logic in response to the query, and to re-rank the query results using a trained machine learning system, the trained machine learning system optionally being characterized by a greater computational complexity than the query logic, optional calibration logic configured to calculate a calibrated score for each of the query results, the calibrated score being representative of a probability that each of the query results would be considered correct by a user, the calibrated score optionally being dependent on both a score returned by the query logic and a score returned by the reranking logic, and optional section selection logic configured to determine the subsets of content within the query results to present to the user. Optionally, this system further comprises feedback logic configured to receive a feedback score from the user, wherein the feedback logic is configured to train the reranking logic based on the feedback score. Optionally, the indexing algorithms include at least two indexing algorithms of different indexing density/granularity.

Various embodiments of the invention include an information retrieval system comprising: indexing logic configured to index content, the content including at least text data and image data, indexing of the content including generation of indexes (embeddings) of dynamic granularity, the granularity being dependent on one or more of: characteristic access patterns for the content, identification of multiple levels of salient points within the content, and a preliminary parsing of the content to determine a level of segmentation; index storage configured to store indexes of the content, the indexes being generated using a plurality of indexing algorithms each configured to generate a separate set of indexes of the content, the content optionally being indexed by more than one set of indexes, the indexing algorithms including at least one of: the indexing logic, BM25, a key word indexer and dual encoding neural networks; and content serving logic configured to provide subsets of the content in response to a search query, the content serving logic comprising any combination of: query routing logic configured to determine which of the sets of indexes stored in index storage a query should be applied to, query logic configured to execute the query on the determined sets of indexes, reranking logic configured to receive one or more sets of query results from the query logic in response to the query, and to re-rank the query results using a trained machine learning system, the trained machine learning system optionally being characterized by a greater computational complexity than the query logic, optional calibration logic configured to calculate a calibrated score for each of the query results, the calibrated score being representative of a probability that each of the query results would be considered correct by a user, the calibrated score optionally being dependent on both a score returned by the query logic and a score returned by the reranking logic, and optional section selection logic configured to determine the subsets of content within the query results to present to the user.

Various embodiments of the invention include a method of retrieving information, the method comprising: receiving content to be indexed, the content optionally including a plurality of media types; indexing the received content using a plurality of indexing algorithms each being configured to generate a separate set of indexes of the content, wherein the indexes include multiple levels of granularity dependent on one or more of: predicted access patterns for the content, identification of multiple levels of salient points within the content, and a preliminary parsing of the content to determine a level of segmentation within the content; storing the indexes of the content in an index storage within a non-transient computer readable medium, the index storage including a data structure configured to store the indexes including the multiple levels of granularity; receiving a search query to search content, including the received content; routing the search query to a subset of the set of indexes of the content; receiving initial search results of executing the search query on the subset of indexes, the initial search results being generated by query logic; reranking the initial results using reranking logic, the reranking logic being different from the query logic and producing reranked results; optionally selecting sections of the initial search results to present to a user and providing the selected sections to the user; optionally calibrating the initial search results to produce a calibration score, the calibrated score being representative of a probability that each of the query results would be considered correct by a user, the calibrated score optionally being dependent on both a score returned by the query logic and a score returned by the reranking logic; optionally receiving feedback from the user regarding correctness of the search results and/or the calibration score; and optionally training the reranking logic based on the received feedback.

DETAILED DESCRIPTION

Figure 1:
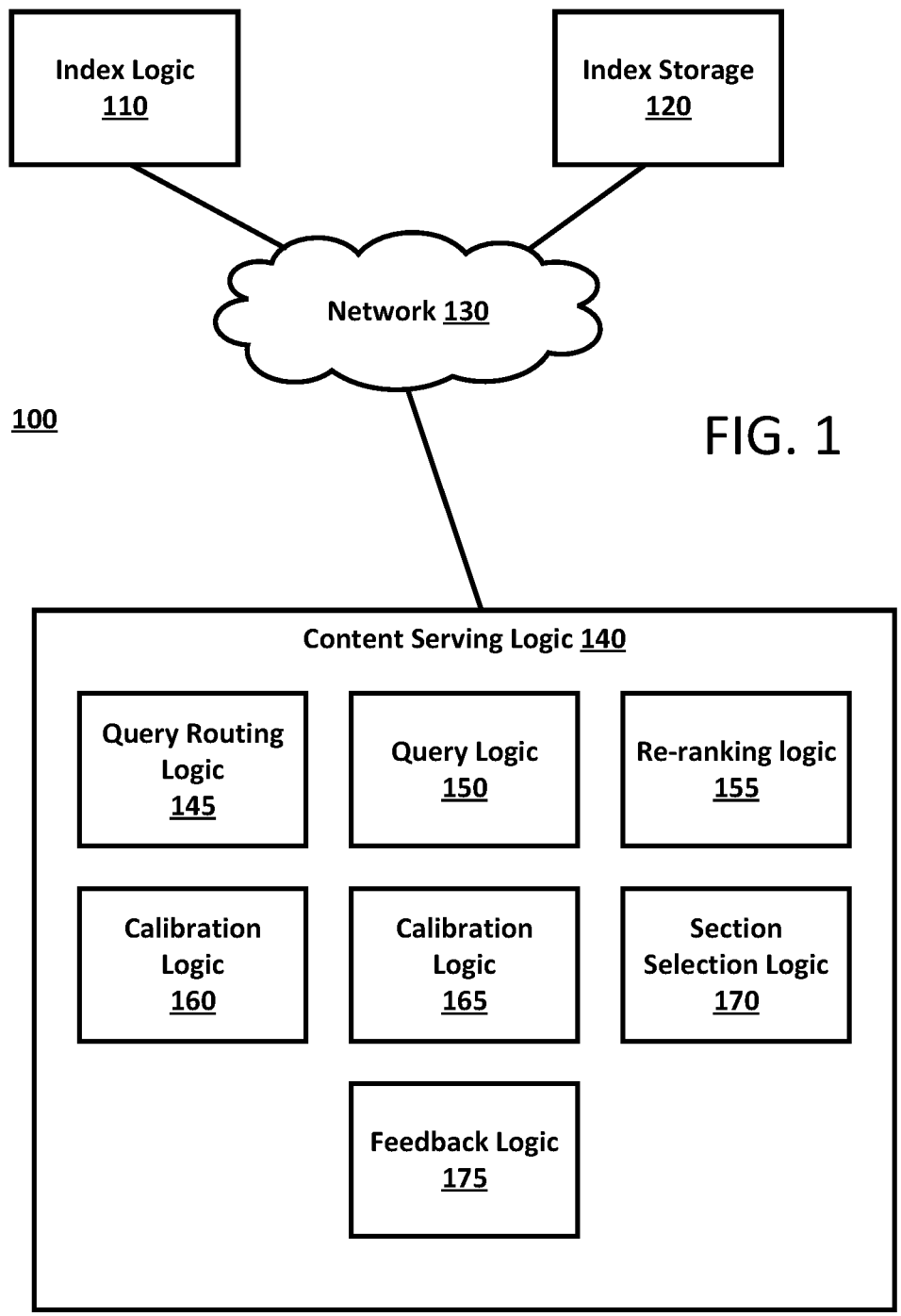
FIG. 1 is a block diagram of an information retrieval system, according to various embodiments of the invention.

FIG. 1 is a block diagram of an Information Retrieval System 100, according to various embodiments of the invention.

Indexing Logic 110 configured to index content, the content including at least text data and image data, indexing of the content including generation of indexes (embeddings) of dynamic granularity, the granularity being dependent on one or more of: characteristic access patterns for the content, identification of multiple levels of salient points within the content, and a preliminary parsing of the content to determine a level of segmentation;

Index Storage 120 configured to store indexes of the content, the indexes being generated using a plurality of indexing algorithms each configured to generate a separate set of indexes of the content, the content optionally being indexed by more than one set of indexes, the indexing algorithms including at least one of: the indexing logic, BM25, a key word indexer and dual encoding neural networks;

optionally the indexing logic includes at least two indexing logic configured to generate indexes of different indexing density/granularity.

Optionally the indexing logic includes at least indexing logic configured to create a keyword index and indexing logic configured to create a subject matter index.

Optionally the indexing logic is configured to dynamically determine the granularity of indexes based on data within the content, and/or configured to dynamically determine different levels of granularity for the indexes of different parts of the content.

Optionally the indexing logic is configured to preprocess the content and based on the preprocessing configured to predict an access pattern for the content, to determine one or more indexing type for the content, to determine salient points of the content, and/or to determine a granularity of the indexes.

Optionally the indexing logic is configured to determine granularity of the indexes based on document paragraph, document sentence, document section, and/or image feature.

Optionally the indexing logic is configured to determine one or more index type for the content and/or granularity of the indexes based on predicted access patterns for the content (based on the preprocessing) and/or on based on actual access patterns for the content.

optionally the access patterns include actual queries that returned the content, links followed to the content, links clicked within the content, user highlighting, viewing or copying of the content, and/or user feedback regarding the content.

Optionally the indexing logic is configured to use one or more of the access patterns to re-index the content.

Optionally the indexing logic is configured to determine the granularity based on a number of salient points found within the content.

Optionally wherein the indexes include a machine learning vector representation regarding the content.

Content Serving Logic 140 configured to provide subsets of the content in response to a search query, the content serving logic comprising any combination of:

Indexing Logic 110, Index Storage 120 and Content Serving Logic 140 are optionally connected by communication Network 130 such as the Internet, a local area network or a wide area network, etc.

query routing logic configured to determine which of the sets of indexes stored in index storage a query should be applied to, Optionally the query routing logic is configured determine which of the sets of indexes the query should be applied to based on a number of words in the query, and/or the types of words in the query (technical terms, nouns, verbs, proper names, etc.).

Query logic configured to execute the query on the determined sets of indexes.

Reranking logic configured to receive one or more sets of query results from the query logic in response to the query, and to re-rank the query results using a trained machine learning system, the trained machine learning system optionally being characterized by a greater computational complexity than the query logic.

Optional calibration logic configured to calculate a calibrated score for each of the query results, the calibrated score being representative of a probability that each of the query results would be considered correct by a user, the calibrated score optionally being dependent on both a score returned by the query logic and a score returned by the reranking logic.

Optionally the calibration logic is configured to weight the score returned by the query logic and the score returned by the reranking logic, optionally based on a relative confidence level for each of these scores.

Optional section selection logic configured to determine the subsets of content within the query results to present to the user.

Optional feedback logic configured to receive a feedback score from the user, wherein the feedback logic is configured to train the reranking logic based on the feedback score.

Figure 2:
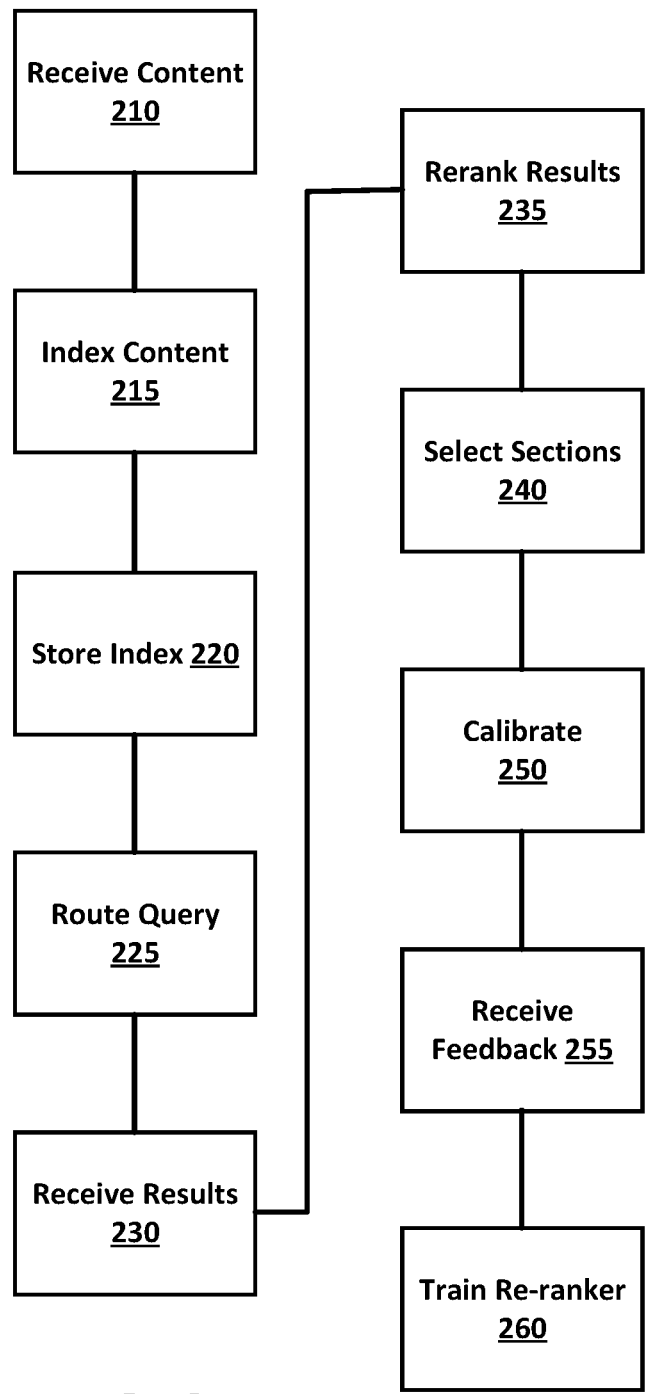
FIG. 2 illustrates methods of retrieving information, according to various embodiments of the invention.

FIG. 2 illustrates methods of retrieving information, according to various embodiments of the invention Receive Content Step 210 includes receiving content to be indexed, the content optionally including a plurality of media types.

Index Content Step 215 includes indexing the received content using a plurality of indexing algorithms each being configured to generate a separate set of indexes of the content, wherein the indexes include multiple levels of granularity dependent on one or more of: predicted access patterns for the content, identification of multiple levels of salient points within the content, and a preliminary parsing of the content to determine a level of segmentation within the content;

Storing the indexes of the content in an index storage within a non-transient computer readable medium, the index storage including a data structure configured to store the indexes including the multiple levels of granularity.

Receiving a search query to search content, including the received content.

Routing the search query to a subset of the set of indexes of the content.

Receiving initial search results of executing the search query on the subset of indexes, the initial search results being generated by query logic.

Reranking the initial results using reranking logic, the reranking logic being different from the query logic and producing reranked results.

Optionally selecting sections of the initial search results to present to a user and providing the selected sections to the user.

Optionally calibrating the initial search results to produce a calibration score, the calibrated score being representative of a probability that each of the query results would be considered correct by a user, the calibrated score optionally being dependent on both a score returned by the query logic and a score returned by the reranking logic.

Optionally receiving feedback from the user regarding correctness of the search results and/or the calibration score.

Optionally training the reranking logic based on the received feedback.

We describe a cloud platform that allows its users to index and query data that is potentially multi-lingual (spanning languages) and multi-media (spanning text, video, images, audio, and potentially other formats). Over time, the system automatically improves the results it displays, on the basis of user feedback signals.

The system consists of the parts numerated below. Each of these parts is designed to work in a multi-tenanted manner, meaning they are designed to manage data for thousands of customers in a secure manner that guarantees no accidental mixing or overlap of data.
  (a) Ingestion. Unique to our ingestion system is the ability to index multimedia data, encompassing not merely a wide range of textual file formats, but also images, video, and raw audio. We process the data with a variety of techniques, including traditional ones (e.g. BM25), and cutting edge deep learning (proprietary dual encoding neural networks).
  (b) Index storage. Unlike traditional IR systems, the system we describe employs multiple indexing technologies, which are deployed selectively based on customer traffic patterns. This includes traditional sparse indexes such as BM25, as well as modern dense indexes optimized for neural retrieval.
  (c.0) Serving. The serving system accepts queries and returns matching relevant results. A relevant result is selected from the media ingested into the corpus. The media item may be returned in whole or in part.
    (a) In whole. Examples include an entire customer review, or a picture.
    (b) In part. Obvious examples are a paragraph from a larger report, or a section heading within a book. Through the application of advanced ML, other examples of parts include: a 10 second clip within a long video presentation, a highlighted section of a scene in a photograph.
  (c.1) Query router. The query router analyzes the characteristics of the incoming query, and determines the optimal set of indexes to query, in order to achieve the best results. This system may perform routing operations heuristically, or in a machine learned manner, and the querying system transitions between these modes based on the characteristics of the customer's data, traffic characteristics, and feedback (see Feedback module below).
  (c.2) Reranker. The reranker receives results from one or more backends, and is responsible for merging and reordering them into a final set. Within our system, the reranker is a machine learned component, and may be either a random forest-type model, or cross-attentional neural network. The choice is made based on the amount of feedback available (see Feedback module below), since that serves as training data for the reranker.
  (c.3) Calibrator. This module may or may not be present, depending on the requirements of the customer. If present, it performs statistical calibration of the output scores, in a manner dependent on available feedback (see Feedback module below).
  (d) Feedback. This module allows customers to provide feedback to the platform on the quality of a particular query result. Quality feedback is initially modeled as a single-dimensional, real-valued quantity between −1 and 1. More generally, however, it can be imagined as a multi-dimensional (vector) quantity. The platform has no say in how the signal is gathered by the client, but possibilities include explicit signals (clicking on thumbs down or thumbs up next to a result), or implicit signals (clicking a result, or skipping a result to click another).

Several embodiments are specifically illustrated and/or described herein. However, it will be appreciated that modifications and variations are covered by the above teachings and within the scope of the appended claims without departing from the spirit and intended scope thereof.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The "logic" discussed herein is explicitly defined to include hardware, firmware or software stored on a non-transient computer readable medium, or any combinations thereof. This logic may be implemented in an electronic and/or digital device (e.g., a circuit) to produce a special purpose computing system. Any of the systems discussed herein optionally include a microprocessor, including electronic and/or optical circuits, configured to execute any combination of the logic discussed herein. The methods discussed herein optionally include execution of the logic by said microprocessor.

The invention claimed is:

1. An information retrieval system comprising:
   indexing logic configured to index content, the content including at least text data and image data, indexing of the content including generation of indexes of dynamic granularity, the granularity being dependent on one or more of: characteristic access patterns for the content, identification of multiple levels of salient points within the content, and a preliminary parsing of the content to determine a level of segmentation;
   index storage configured to store indexes of the content, the indexes being generated using a plurality of indexing algorithms each configured to generate a separate set of indexes of the content, the content being indexed by more than one set of indexes, the indexing algorithms including at least one of: the indexing logic, a key word indexer and dual encoding neural networks; and
   content serving logic configured to provide subsets of the content in response to a search query, the content serving logic comprising:
      query routing logic configured to determine which of the sets of indexes stored in index storage a query should be applied to,
      query logic configured to execute the query on the determined sets of indexes,
      reranking logic configured to receive one or more sets of query results from the query logic in response to the query, and to re-rank the query results using a trained machine learning system,
      calibration logic configured to calculate a calibrated score for each of the query results, the calibrated score being representative of a probability that each of the query results would be considered correct by a user, the calibrated score being dependent on both a score returned by the query logic and a score returned by the reranking logic, and
      section selection logic configured to determine the subsets of content within the query results to present to the user.

2. The system of claim 1, further comprising feedback logic configured to receive a feedback score from the user, wherein the feedback logic is configured to train the reranking logic based on the feedback score.

3. The system of claim 1, wherein the indexing logic includes at least two indexing logic configured to generate indexes of different indexing granularity.

4. The system of claim 1, wherein the indexing logic includes at least indexing logic configured to create a keyword index and indexing logic configured to create a subject matter index.

5. The system claim 1, wherein the indexing logic is configured to dynamically determine the granularity of indexes based on data within the content, and configured to dynamically determine different levels of granularity for the indexes of different parts of the content.

6. The system of claim 1, wherein the indexing logic is configured to preprocess the content and based on the preprocessing being configured: to predict an access pattern for the content, to determine one or more indexing type for the content, to determine salient points of the content, and es to determine a granularity of the indexes.

7. The system of claim 1, wherein the indexing logic is configured to determine granularity of the indexes based on document paragraph, document sentence, document section, and image feature.

8. The system of claim 1, wherein the indexing logic is configured to determine one or more index type for the content and granularity of the indexes based on predicted access patterns for the content and on based on actual access patterns for the content.

9. The system of claim 1, wherein the access patterns include actual queries that returned the content, links followed to the content, links clicked within the content, user highlighting, viewing or copying of the content, and user feedback regarding the content.

10. The system of claim 1, wherein the indexing logic is configured to use one or more of the access patterns to re-index the content.

11. The system of claim 1, wherein the query routing logic is configured determine which of the sets of indexes the query should be applied to based on a number of words in the query, and the types of words in the query.

12. The system of claim 1, wherein the indexing logic is configured to determine the granularity based on a number of salient points found within the content.

13. The system of claim 1, wherein the calibration logic is configured to weight the score returned by the query logic and the score returned by the reranking logic, based on a relative confidence level for each of these scores.

14. The system of claim 1, wherein the indexes include a machine learning vector representation regarding the content.

15. A method of retrieving information, the method comprising:
   receiving content to be indexed, the content including a plurality of media types;
   indexing the received content using a plurality of indexing algorithms each being configured to generate a separate set of indexes of the content, wherein the indexes include multiple levels of granularity dependent on one or more of: predicted access patterns for the content, identification of multiple levels of salient points within the content, and a preliminary parsing of the content to determine a level of segmentation within the content;
   storing the indexes of the content in an index storage within a non-transient computer readable medium, the index storage including a data structure configured to store the indexes including the multiple levels of granularity;
   receiving a search query to search content, including the received content;
   routing the search query to a subset of the set of indexes of the content;
   receiving initial search results of executing the search query on the subset of indexes, the initial search results being generated by query logic;
   reranking the initial results using reranking logic, the reranking logic being different from the query logic and producing reranked results;
   selecting sections of the initial search results to present to a user and providing the selected sections to the user;
   calibrating the initial search results to produce a calibration score, the calibrated score being representative of a probability that each of the query results would be considered correct by a user, the calibrated score being dependent on both a score returned by the query logic and a score returned by the reranking logic;

receiving feedback from the user regarding correctness of the search results and the calibration score; and training the reranking logic based on the received feedback.

* * * * *